(12) United States Patent
Carmon

(10) Patent No.: US 6,403,131 B1
(45) Date of Patent: Jun. 11, 2002

(54) INDICATOR FOR PROPER HEATING OF FOOD AND A METHOD FOR CONSTRUCTING THEREOF

(75) Inventor: Amiram Carmon, Jerusalem (IL)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/953,208

(22) Filed: Sep. 17, 2001

Related U.S. Application Data

(62) Division of application No. 09/254,905, filed as application No. PCT/IL97/00306 on Sep. 14, 1997, now Pat. No. 6,289,794.

(30) Foreign Application Priority Data

Sep. 17, 1996 (IL) .................................................. 119255

(51) Int. Cl.$^7$ ................................................. A23L 1/00
(52) U.S. Cl. ........................................ 426/233; 426/523
(58) Field of Search .............................. 426/231, 233, 426/520, 523; 99/342, 419; 116/217, 281; 374/134, 162

(56) References Cited

U.S. PATENT DOCUMENTS

| | | | | |
|---|---|---|---|---|
| 3,724,360 A | * | 4/1973 | Kliewer et al. ................ 99/342 |
| 4,082,000 A | * | 4/1978 | Volk ............................ 73/358 |
| 4,083,364 A | * | 4/1978 | Kelly et al. .................... 73/356 |
| 4,137,769 A | * | 2/1979 | Parker ........................... 73/356 |
| 4,187,799 A | * | 2/1980 | Zwarun ......................... 73/358 |
| 4,230,731 A | * | 10/1980 | Tyler ........................... 426/233 |
| 5,537,950 A | * | 7/1996 | Ou-Yang ....................... 99/342 |
| 5,799,606 A | * | 9/1998 | Volk et al. ................... 116/218 |
| 6,299,921 B1 | * | 10/2001 | Loffler et al. ............... 426/233 |

* cited by examiner

Primary Examiner—George C. Yeung
(74) Attorney, Agent, or Firm—Millen, White, Zelano & Branigan, P.C.

(57) ABSTRACT

A device and a method are disclosed for indicating the reaching of a temperature within a predetermined temperature range by heated food. The device includes a transparent sealed container including a first compartment containing a first substance and a second compartment containing a second substance. The first compartment is separated from the second compartment by a meltable sealant having a melting point within the predetermined temperature range. The device is partially or fully immersed in the heated food and on reaching a temperature within the predetermined temperature range, the meltable sealant melts enabling the first substance to contact the second substance. The contact between the first substance and the second substance results in a detectable change such as a color change of at least one of the first substance and the second substance. The color change is visibly detectable through the transparent sealed container. The device can be made in a variety of shapes and may include an elongated member attached to the sealed container for facilitating the placing of the device within the food.

11 Claims, 1 Drawing Sheet

INDICATOR FOR PROPER HEATING OF FOOD AND A METHOD FOR CONSTRUCTING THEREOF

RELATED APPLICATION

This is a divisional application of U.S. patent Ser. No. 09/254,905 filed on Jun. 22, 1999, now U.S. Pat. No. 6,289,794, which issues on Sep. 18, 2001 which is a 371 of PCT/IL97/00306 filed Sep. 14, 1997.

FIELD OF THE INVENTION

The present invention relates to the field of devices for indicating the proper heating of food.

BACKGROUND OF THE INVENTION

Food originating form animal sources may often contain certain infectious microorganisms. Some of these microorganisms are resistant to temperatures which are less than the boiling temperature of water, but will perish if the food is cooked at a higher temperature. For example, an organism that is responsible for about 75% of the cases of food poisoning in the USA, *Escherichia Coli*, will be killed at about 75 degrees centigrade. A virulent variant, Coli 0–157 was responsible for mass infection of over 8000 people in the city of Sakai, Japan. The source of the infection was identified as partially cooked beef liver. The food in this case was cooked in a central kitchen and distributed to a number of municipal schools. Apparently, the dining room supervisor had not been aware of the fact that the food was improperly cooked, and that the required cooking temperature was not reached.

Had the food been cooked at a temperature that kills the bacteria, such massive food poisoning could have been avoided.

SUMMARY OF THE PRESENT INVENTION

Therefore, among the objects of the present invention is to provide a device for determining whether a food substance was cooked to a required temperature. The device operates by exhibiting a detectable change after reaching the required cooking temperature.

It is a feature of the device that the detectable change is stable when the food is cooled after cooking.

Another feature of the device is that it is made of such materials and structure that permit direct contact with the food.

Yet another feature of the device is that it contains substances of such nature and in such quantities that even if the device is inadvertently swallowed by a person or ruptured during cooking dispersing its contents into the cooked food, it will not cause any significant harm to a person swallowing the device or s ingesting the food which the contents of the ruptured device were dispersed.

Still another feature of the device of the present invention is that the detectable change will be caused by the temperature change, and that no other action, such as mechanical action, is required.

There is therefore provided, in accordance with a preferred embodiment of the present invention, a device for indicating reaching of a temperature within a predetermined temperature range by a heated substance. The device includes a transparent sealed container including a first compartment having a first substance therein. The second substance therein, and a meltable sealant separating the first compartment from the second compartment. The meltable sealant has a melting point at a temperature within the predetermined temperature range. On reaching a temperature within the predetermined temperature range the meltable sealant melts enabling the first substance to contact the second substance. The contact between the first substance and the second substance results in a detectable change in at least one of the first substance and the second substance.

Further, in accordance with another preferred embodiment of the present invention, the second compartment is a second container placed within the transparent sealed container.

Further, in accordance with yet another preferred embodiment of the present invention, the heated substance is food and the first substance and second substance are non-toxic in the quantities used within the device.

Further, in accordance with another preferred embodiment of the present invention, the detectable change is a visible color change.

Furthermore, in accordance with another preferred embodiment of the present invention, the detectable change is stable upon cooling the device.

Furthermore, in accordance with another preferred embodiment of the present invention, the meltable sealant is a wax.

Furthermore, in accordance with another preferred embodiment of the present invention, the device is disposable.

Furthermore, in accordance with another preferred embodiment of the present invention. The device also includes an elongated member attached to the transparent sealed container for placing the transparent container within the heated substance and for retrieving the transparent container from within the heated substance.

Further, in accordance with another preferred embodiment of the present invention, the transparent sealed container is an elongated container having a first end and a second end. The first end is inserted into a portion of the heated substance such that the second end protrudes out of the portion for enabling the detectable change occurring when the inner part of the portion reaches the temperature to be detected at the second end.

Furthermore, in accordance with another preferred embodiment of the present invention, at least one of the first end and second end is tapered to facilitate inserting the transparent sealed container into the portion.

Furthermore, in accordance with another preferred embodiment of the present invention, the portion of the heated substance is a piece of meat to be cooked and the device is used to determine whether the inner portion of the piece of meat has reached the temperature.

Furthermore, in accordance with another preferred embodiment of the present invention, the first substance is a solution of a pH sensitive indicator dye or a pH sensitive dye in a solid form and the second substance is a solid or solution capable of changing the pH of the first substance upon mixing therewith to a value sufficient to cause a detectable color change in the first substance. At least one of the first substance and second substance is a liquid.

Furthermore, in accordance with another preferred embodiment of the present invention, the first substance is a solution of a leuco dye in aqueous ethanol, and the second substance is selected from the group consisting of a solution of citric acid in ethanol, an aqueous solution of citric acid and crystals of citric acid.

Furthermore, in accordance with another preferred embodiment of the present invention, the first substance is a solution of the leuco dye Copikem 7 in 95% ethanol 5% water, and the second substance is selected from the group consisting of a solution of 0.5% citric acid in 95% ethanol 5% water, an aqueous solution of citric acid and crystals of citric acid.

There is also provided a method for determining whether a heated substance has reached a temperature within a predetermined temperature range. The method uses a device including a transparent sealed container. The transparent sealed container includes a first compartment having a first substance therein, a second compartment having a second substance therein and a meltable sealant separating the first compartment from the second compartment. The meltable sealant has a melting point at a temperature within the predetermined temperature range. On reaching a temperature within the predetermined temperature, the meltable sealant melts enabling the first substance to contact the second substance. The contact between the first substance and the second substance results in a detectable change in at least one of the first substance and second substance. The method includes the steps of inserting at least part of the device into the heated substance and checking at least part of the transparent sealed container subsequent to the step of inserting to determine whether the detectable change occurred within the transparent sealed container.

BRIEF DESCRIPTION OF THE DRAWINGS

The present invention will be understood and appreciated more fully from the following detailed description taken in conjunction with the drawings in which.

DETAILED DESCRIPTION

Figure 1:
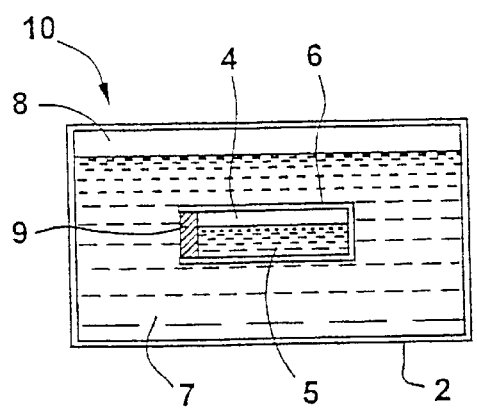
FIG. 1 is a schematic cross section illustrating a device for indicating reaching of a predetermined temperature by cooked food, in accordance with a preferred embodiment of the present invention.

Reference is now made to FIG. 1 which is a schematic cross section illustrating a device for indicating reaching of a predetermined temperature by cooked food, in accordance with a preferred embodiment of the present invention.

The device 10 includes a sealed container 2 made from a transparent material such as a transparent plastic. Preferably, the material is a material which can be safely put in contact with food, for example, a suitable material can be selected from a list prepared by the USA governments Food and Drug Administration (Code of Federal Regulations, chapter21, parts 170 to 199). In a non limiting example, the container 2 is made from polyethylene or polypropylene.

The container 2 also includes a second container 6 therein. The container 6 is smaller than the container 2 and is made from plastic or any other suitable material. The container 6 is sealed with a meltable sealant 9. The container 2 is thus divided into two compartments 4 and 8 separated by the meltable sealant 9. Compartment 4 contains a liquid 5therein and compartment 8 contains a liquid 7 therein. The liquids 5 and 7 are prevented from mixing by the meltable sealant 9.

The meltable sealant 9 is made from a material having a predefined melting temperature. In a non-limiting example, the meltable sealant is the homopolymer polyethylene wax with a melting temperature range of 98–105° C. commercially available from BASF Aktiengesellschaft, Schwarzheide, Germany.

In accordance with a preferred embodiment of the present invention, the liquid 5 is a 0.3% solution of the leuco dye Copikem 1 Blue CVL in a 95% ethanol and 5% water mixture and the liquid 7 is an aqueous solution of 0.5% citric acid in a 95% ethanol and 5% water mixture. Copikem 1 Blue CVL is a leuco dye, commercially available from Hilton-Davis corporation Ohio, U.S.A..

Some Leuco dyes are colorless in solution but change their color in an acidic environment. The color of a solution the exemplary dye Copikem 1 turns from colorless to blue in an acidic environment.

When the device 10 is immersed in the food to be cooked and the temperature of the device 10 reaches the melting point of the sealant 9, the sealant 9 melts and the liquids 5 and 7 mix. The mixing of the liquids 5 and 7 causes an acidification of the dye solution comprising liquid 7 causing the color of the mixed liquids 5 and 7 to turn blue. The blue color can be observed through the transparent container 2 indicating that the cooked food has reached the predetermined temperature. The blue color is stable upon cooling of the cooked food and can withstand heating up to 100° C. This has the advantage that the device 10 can be left unattended during cooking of the food, yet the color change indicating that the food has reached the proper temperature can also be observed after the food is cold and will also not be affected by overcooking of the food.

Figure 2:
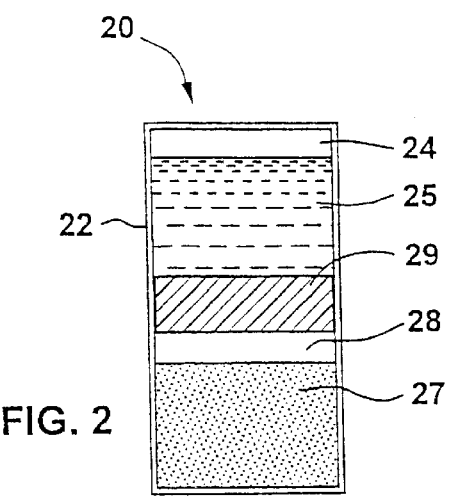
FIG. 2 is a schematic cross section illustrating a device for indicating reaching of a predetermined temperature by cooked food, in accordance with another preferred embodiment of the present invention.

Reference is now made to FIG. 2 which is a schematic cross section illustrating a device for indicating reaching of a predetermined temperature by cooked food, in accordance with another preferred embodiment of the present invention.

The device 20 includes a sealed transparent container 22. The container 22 is divided into two compartments 24 and 28 by a meltable sealant 29. The compartment 24 contains a liquid 25 therein and the compartment 28 contains a solid substance 27 therein. In a non-limiting example, the liquid 25 is similar in composition to the liquid 5 of FIG. 1 disclosed hereinabove and the solid substance 27 is crystals of citric acid. When the device 20 is immersed in the food to be cooked and the temperature of the device 20 reaches the melting point of the sealant 29, the sealant 29 melts and the liquid 25 comes into contact with the crystals of citric acid of compartment 28. The contact between the liquid 25 and the citric acid crystals of solid substance 27 causes an acidification of the Copikem 1 dye solution comprising fluid 25 causing a blue color to be formed on and near the aspects of the citric acid crystals. The blue color can be observed through the transparent container 22 indicating that the cooked food has reached the predetermined temperature.

In accordance with another preferred embodiment of the present invention. The device 10 and the device 20 of FIGS. 1 and 2, respectively further include an elongated rod or member (not shown) attached thereto for facilitating the handling and insertion of the devices 10 and 20 into the food which is being cooked. This rod may assist the placing the device 10 and 20 in a desirable position within the cooked food. The elongated member may be formed as an integral part of the sealed container 2 and 22. Alternatively, the elongated member can be detachably attached to the container 2 and 22 such that after use the container 2 and 22 may be detached form the elongated member and a new unused container 2 or 22 may be attached to the elongated member for further use. The elongated member can be made form any suitable material approved for contact with food. In non-limiting examples, the elongated member is made from polyethylene or polypropylene.

A problem often encountered in cooking of relatively large pieces of food is that when a large piece of food such as a piece of meat is immersed in a heated liquid for cooking, the heat penetrates the meat from the surface which is in contact with the cooking liquid inwards. Thus, in meat pieces having a relatively large mass, the time required for proper cooking of the inside portion of the meat is longer than the time required for proper cooking of the portion of the meat that is closer to the surface of the piece. In such a case, immersing the device 10 in the cooking liquid may lead to an erroneous indication since the device 10 may reach the proper predetermined temperature and turn blue while the inside portion of the meat has not yet reached the predetermined temperature required to ensure the killing of infectious microorganisms.

Figure 3:
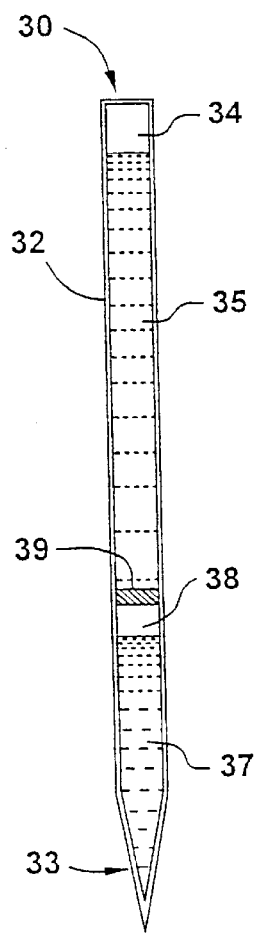
FIG. 3 is a schematic cross section illustrating a device for indicating reaching of a predetermined temperature inside a piece of cooked food, in accordance with another preferred embodiment of the present invention.
Figure 4:
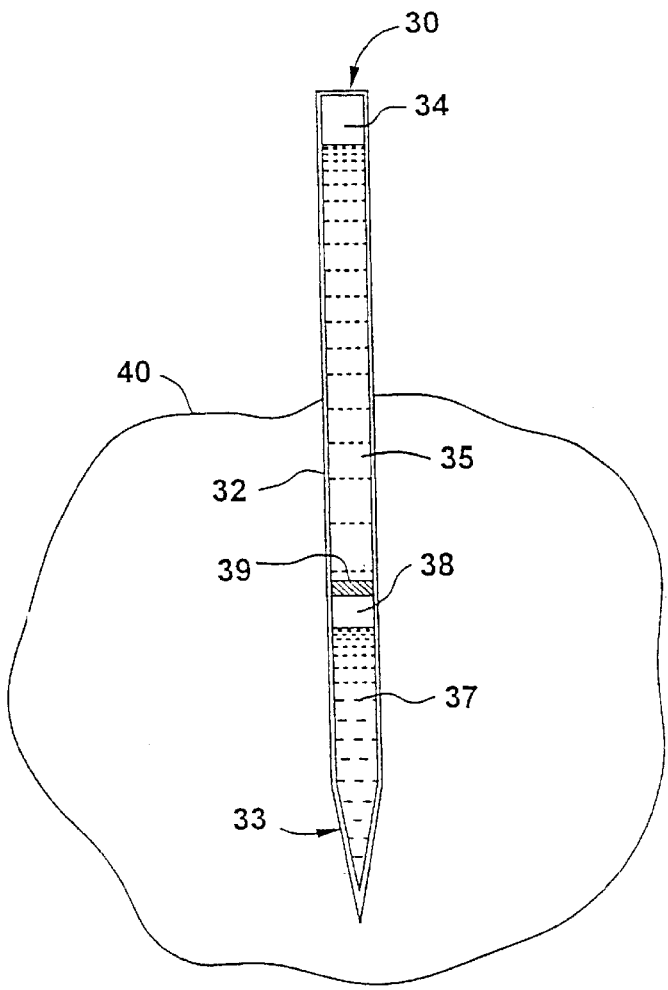
FIG. 4 is a schematic cross section illustrating the device of FIG. 3 inserted into a piece of food to be cooked.

Reference is now made to FIGS. 3 and 4 which are schematic cross sections illustrating a device for indicating reaching of a predetermined temperature inside a piece of cooked food, in accordance with another preferred embodiment of the present invention. The device 30 of FIGS. 3 and 4 includes a sealed transparent container 32. The container 32 is divided into two compartments 34 and 38 by a meltable sealant 39. The compartment 34 contains a liquid 35 therein and the compartment 38 contains a solid substance 37 therein. In a non-limiting example, the liquid 25 is similar in composition to the liquid 5 of FIG. 1, the liquid 37 is similar in composition to the liquid 7 Of FIG. 1 and the meltable sealant 39 is the homopolymer polyethylene wax of FIG. 1 as disclosed hereinabove.

In contrast to the container 22 device 20 of FIG. 2, the container 32 of the device 30 has an elongated shape and has a tapered end 33 to facilitate the insertion of part of the device 30 into a piece of food.

FIG. 4 illustrates the use of the device 30 of FIG. 3 for indicating whether a predetermined temperature has been reached inside a piece of meat 40. The device 30 is inserted into the piece of meat 40 by pushing the tapered end 33 of the device 30 into the piece of meat 40 until the meltable sealant 39 is positioned approximately in the center of the piece of meat 40. The end of the device 30 which is opposite the tapered end 33 is left protruding from the piece of meat 40. The piece of meat 40 can then be cooked. The device 30 operates similarly to he device 10 disclosed hereinabove, except that the color change of the device 30 is observed at the end of the device 30 which protrudes from the piece of meat 40.

It is noted that the devices 10, 20 and 30 may be made in any shape suitable for observing the color change. For example, the devices 10 and 20 may be shaped as an ampoule having a circular or rectangular cross section, as a flat bag or in any other suitable shape. Additionally, the material from which the sealed containers 2 and 22 are made can be flexible or rigid. In contrast, the sealed container 32 of the device 30 must be made of a material having sufficient rigidity to enable penetration of the device 30 inside the meat piece 40.

It is further noted that, preferably, the devices 10, 20 and 30 are constructed to be safe for use with food. For example, the sealed transparent containers 2, 22 and 32 which come in contact with the food are made from a material approved for contact with food as disclosed in detail for the container 2 hereinabove. Additionally, the nature and quantities of the substances contained within the devices 10, 20 and 30 can be selected such that even in case of breaching of the sealed containers 2, 22 and 32, respectively, and spilling of the substances contained therein into the food, the ingestion of the food containing the spilled substances by a person will not be harmfull to that person.

For example. The total quantity of the liquids 5 and 7 needed to achieve a perceptible visual color change in the device 10 of FIG. 1 is small, less than a gram or 1 cubic centimeter, if the container is flat and clear.

Ethanol and citric acid which are contained in liquids 5 and 7, respectively, are edible materials, and in the range of less than 1 gram of ethanol and 50 milligrams of citric acid will not harm children and adults. Copikem 1 Blue CVL which is present at a quantity of 30 milligrams in liquid 7 is considered to cause problems only if digested I a quantity of 5000 milligrams and over. Thus, the device 10 can be placed in direct contact with food.

It is also noted that, in the devices 10, 20 and 30 of FIGS. 1, 2 and 3, id respectively, the liquids 5, 7, 25, 35 and 37 do not completely fill the compartments 4, 8, 24, 34 and 38, respectively. This leaves some extra space in the compartments to accommodate for expansion of the liquids 5, 7, 25, 35 and 37 caused by heating of these liquids during the immersion of the devices 10, 20 and 30 in cooking food. However, if the sealed containers 2, 22 and 32 are constructed from a material that can withstand the pressure due to the in expansion of the liquids, the compartments 4, 8, 24, 34 and 38 can be completely filled with the liquids 5, 7, 25, 35 and 37, respectively.

It is still further noted that, while the device 10 include two liquids 5 and 7 the device 30 includes two liquids 35 and 37 and the device 20 includes a liquid 25 and a solid 27, any of these devices can contain a liquid and a solid or two liquids as disclosed in detail hereinabove.

It will be appreciated by those skilled in the art, that the particular compositions of the liquids and/or solids included in the devices 10, 20 and 30 are given by example only and that many other combinations of different liquids or different liquids and solids can be used in any of the devices as long as the color change caused by their mixing is clearly observable and that they are not harmful if ingested in the quantities which are present in the devices.

Furthermore, if a solid is used as the substance included in any of the compartments of any of the devices disclosed hereinabove, the solid can be any suitable solid for causing a color change upon contact with the liquid contained in the other compartment of the same device. For example, in the device 20, the solid 27 can be a piece of a porous material soaked in a solution of citric acid or soaked in a solution of citric acid and dried. The porous material can be any suitable porous material such as paper, a porous plastic material or any other suitable porous material having a suitable color such as white, transparent or another suitable color that will not obscure the color change of the dye.

It is noted that, the meltable sealant 9, 29 and 39 of FIGS. 1, 2 and 3, respectively, can be made of any suitable meltable sealing material that has a to desired melting temperature range. Preferably, the meltable sealing material should not be harmful to humans if ingested in the quantity that is contained in one of the devices 10, 20 and 30 disclosed hereinabove.

It is further noted that, while commercially available leuco dyes change color from a white solid or transparent colorless solution to a visible color upon acidification, any other dyes or substances may be used which upon mixing with another substance or solution change from a first color to a second color clearly distinguishable from the first color.

Furthermore, while the devices 10, 20 and 30 of the present invention are adapted for indicating that a predetermined temperature has been reached in cooked food, the devices can be adapted to indicating the reaching of a predetermined temperature by any other material that is being heated. The heated material may be a solid in powdered or granular form, a liquid, a gel or any other form of material in which one of devices 10, 20 and 30 can be immersed.

In the case that the material checked for reaching the predetermined temperature is not for human use, the non-toxicity requirements applied to the constituents of the devices 10, 20 and 30 can be relaxed.

It is still further noted that, while the devices 10, 20 and 30 operate by exhibiting a visible color change after the predetermined temperature has been reached, other embodiments of the device of the present invention can be implemented in which the change in the device is a detectable change in one or more of the substances included in the device. For example at least one of the liquids or solids included in one of the two compartments of the devices 10, 20 and 30 can change from being transparent to being opaque upon coming in contact with the liquid or solid included in the other compartment of the corresponding devices.

While the invention has been described with respect to a limited number of embodiments, it will be appreciated that many variations, modifications and other applications of the invention may be made.

It will be appreciated by persons skilled in the art that the present invention is not limited to what has been particularly shown and described to hereinabove. Rather the scope of the present invention is defined only by the claims which follow.

What is claimed is:

1. A method for determining whether a heated substance has reached a temperature within a predetermined temperature range using a device comprising a transparent sealed container including a first compartment having a first substance therein, a second compartment having a second substance therein and a meltable sealant separating said first compartment from said second compartment, said meltable sealant having a melting point at a temperature within said predetermined temperature range, wherein on reaching said temperature, said meltable sealant melts enabling said first substance to contact said second substance, the contact between said first substance and said second substance resulting in a detectable change in at least one of said first substance and said second substance, the method comprising the steps of:

inserting at least part of said device into said heated substance; and checking at least part of said transparent sealed container subsequent to said step of inserting to determine whether said detectable change occurred within said transparent sealed container.

2. The method according to claim 1, wherein said second compartment is a second container placed within said transparent sealed container.

3. The method according to claim 1 wherein said heated substance is food and wherein said first substance and said second substance are non-toxic in the quantities used within said device.

4. The method according to claim 1 wherein said detectable change is a visible color change.

5. The method claim according to claim 1 wherein said detectable change is stable upon cooling said device.

6. The method according to claim 1 wherein said meltable sealant is a wax.

7. The method according to claim 1 wherein said device is disposable.

8. The method according to claim 1 wherein said device further comprises an elongated member attached to said transparent scaled container for placing said transparent container within said heated substance and for retrieving said transparent container from within said heated substance.

9. The method according to claim 1 wherein said transparent sealed container is an elongated container having a first end and a second end wherein said first end is inserted into a portion of said heated substance such that said second end protruded out of said portion for enabling said detectable change occurring when the inner part of said portion reaches said temperature to be detected at said second end.

10. The method according to claim 9 wherein at least one of said first end and said second end is tapered to facilitate inserting said transparent sealed container into said portion.

11. The method according to claim 9 wherein said portion of said heated substance is a piece of meat to be cooked and wherein said device is used to determine whether the inner portion of said piece of meat has reached said temperature.

\* \* \* \* \*

UNITED STATES PATENT AND TRADEMARK OFFICE
CERTIFICATE OF CORRECTION

PATENT NO.      : 6,403,131 B1
DATED           : June 11, 2002
INVENTOR(S)     : Carmon It is certified that error appears in the above-identified patent and that said Letters Patent is hereby corrected as shown below:

Title page,
Item [57], ABSTRACT,
Line 1, of the ABSTRACT, delete "arc" and insert -- are --.

Signed and Sealed this

Fourth Day of February, 2003

JAMES E. ROGAN
*Director of the United States Patent and Trademark Office*